United States Patent Office 3,433,644
Patented Mar. 18, 1969

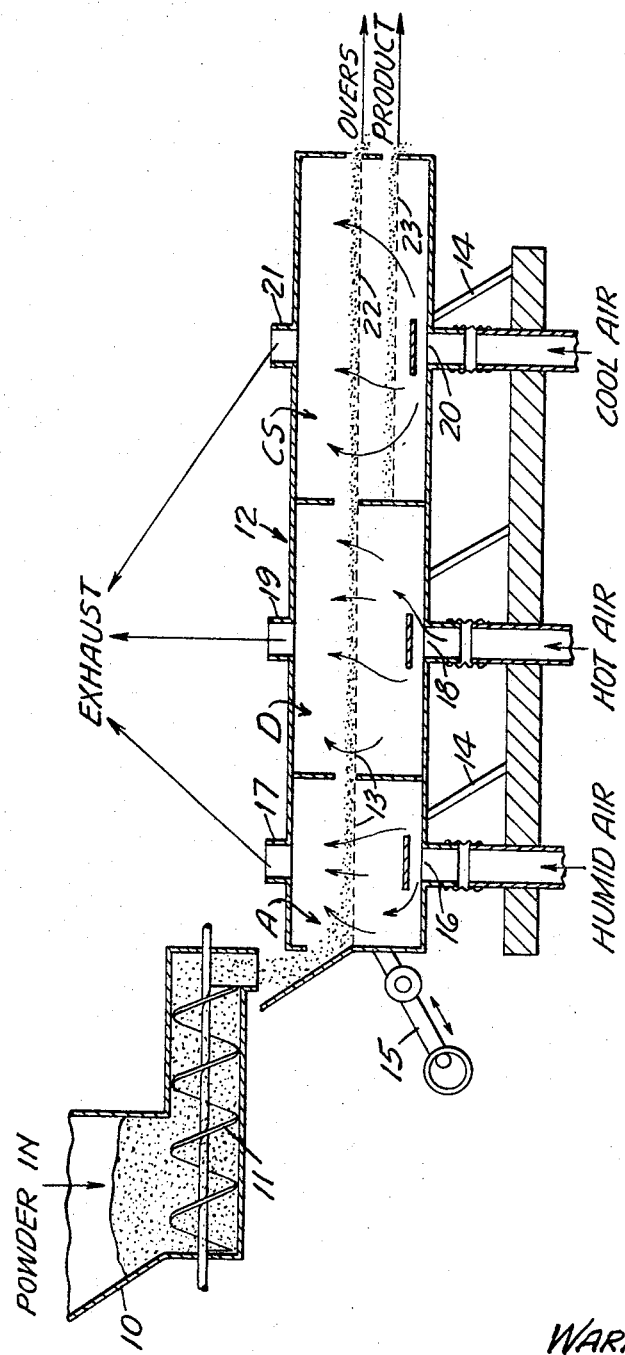

3,433,644
INSTANT DRINK MIX
Warren L. Ganske, Osseo, Jolyon A. Stein, Minneapolis, Rolf G. Gidlow, North St. Paul, and Fred H. McCarron, Minneapolis, Minn., assignors to The Pillsbury Company, Minneapolis, Minn., a corporation of Delaware
Filed May 13, 1964, Ser. No. 367,113
U.S. Cl. 99—78
Int. Cl. A23l 1/34, 1/26
14 Claims

ABSTRACT OF THE DISCLOSURE

Agglomerated drink mixes are prepared from an admixture of particulates primarily comprised of citric acid and an artificial sweetening agent and coloring agent particles as a minor ingredient thereof. A majority of the admixture particles are less than 105 microns with a majority of the citric acid particles being less than 62 microns. In the agglomeration process, the particles are moistened by subjecting the particulates to a humid atmosphere and imparting thereto by condensation from 0.5 percent to 3.5 percent additional moisture, the moistened particles are then commingled to provide random aggregates and subsequently dried. The resultant porous, free-flowing aglomerates are readily soluble in cold water and have a uniform color with the citric acid particles primarily providing the structure therefor.

---

This invention relates to dry mixes from which soft drink type beverages can be prepared by reconstituting same with a liquid such as water and more particularly to a fruit flavored beverage mix of the low calorie type. Conventional fruit flavored beverage mixes are unagglomerated mechanical admixtures which contain an edible acid, a sweetener, flavoring (either natural or artificial) and coloring and are usually dissolved directly in cold water. Some of these mixes utilize natural sugars such as sucrose or dextrose or some combination thereof as the sweetening agent, whereas other mixes use a synthetic non-caloric sweetener to provide a low calorie dietetic type mix and beverage. The most common acidulant is citric acid. However, other acidic agents such as fumaric and tartaric acid are also used.

Conventional unagglomerated mixtures of this type are not readily wettable and dispersible when added to a liquid, particularly a cold liquid, and tend to lump up in difficult to disperse and wet masses when attempting to form the desired beverage therefrom and usually require vigorous stirring to get them into solution. These products tend to cake and lump up in storage, particularly in humid climates, and have poor flow characteristics. These conventional mixes also require the use of a non-functional inert bulking agent or diluent such as mannitol which diluent usually comprises approximately half of the product. This diluent is expensive and materially increases the cost of the product, and in the case of a low calorie type mix, increases the caloric content thereof since there is no known non-caloric bulking agent suitable for use in this type of mix. These mixes also have a fruit flavoring and coloring synonymous with or suggesive of the type of flavoring. In the conventional dry mix, the color of the mix is very pale compared with the natural color of the fruit of its flavoring and the color of the beverage when reconstituted in a liquid, the coloring of the dry mix being so pale as to not be properly suggestive of the fruit with which the flavoring corresponds. Conventional mixes are difficult to measure with any degree of speed and accuracy, particularly when the mix is being packaged. As a result, it is difficult to obtain a uniform amount of product in each package, and the handling of the material is more difficult and expensive than is desirable. The conventional mixes are quite dusty with the usual undesirable results associated therewith. Since these mixes contain coloring, when the dust disperses and settles anywhere but in the container where it belongs, the dusty particles stain the object upon which they come to rest when they acquire moisture in any way.

The aforementioned flavoring is present in very small amounts and normally takes the form of tiny capsules in the dry mix. These capsules tend to separate from the other material during handling. It is, therefore, difficult to maintain uniformity of distribution of the flavoring capsules in the dry mix when the mix is handled after the initial physical admixing of all the ingredients, and prior to the actual packaging thereof. Because of this, it is difficult to obtain uniform flavor distribution from package to package.

The object of this invention is to eliminate the aforementioned problems associated with conventional drink mixes of the type under consideration by providing a novel agglomerated instant drink mix and methods and means for making same.

More specifically, it is the object of this invention to provide an agglomerated instant drink mix which does not require the use of a non-functional inert bulking agent or diluent; has improved color which closely resembles the natural color of the fruit of the flavoring; can be measured with speed and accuracy; is not dusty; has an improved rate of solution; has uniform flavor distribution; and is free flowing and non-caking.

A more specific object is to provide a low calorie instant drink mix having the aforementioned improved qualities and which basically comprises a synthetic sweetener, flavoring, coloring and citric acid as the acidulant and bonding agent for the agglomerated product, and has fewer calories than the low calorie mixes now available.

These and other objects and advantages of this invention will more fully appear from the following description made in connection with the accompanying drawing which is a somewhat diagrammatic illustration of apparatus which has proved very successful in carrying out the method of this invention and forming the type of agglomerated instant drink mix contemplated by this invention.

The low calorie type drink mixes under consideration consist primarily of citric acid and a non-caloric artificial sweetener with minor quantities of flavoring and coloring added thereto. Some of the acidity may be provided by other acidulants such as fumaric or tartaric acid. However, enough citric acid is provided to provide a sufficient amount of bonding agent for the product of this invention. The synthetic sweetener may be of any type desired so long as it is edible and water soluble. We have found the most preferable synthetic sweeteners for use in this type of product to be the cyclamates and saccharines (especially the sodium and calcium salts thereof) or mixtures thereof. We prefer a mixture of cyclamate and saccharine in a ratio of about 12 parts of cyclamate to each part of saccharine for purposes of taste and economy. The flavoring may be of any type desired and is usually a fruit flavoring such as raspberry, orange, grape, lime, strawberry, cherry and the like. The coloring is synonymous with the type of flavoring in each particular instance, such as yellow for lemon, purple for grape, etc. The low calorie drink mixes of this invention preferably comprise about 54% to 67% citric acid, about 27 to 33% cyclamate, about 2 to 3% saccharine, about 1.5 to 3% flavoring and about .5 to 2% coloring. In some instances, it is desirable to have a buffer such as sodium citrate present, which buffer is usually present in an amount of about 8%. If a buffer is used, less acidulant and more sweetener is used than when there is no buffer. However, it will be understood that the aforementioned proportions can be varied within the scope of this invention.

Broadly speaking, the method of this invention comprises reducing the ingredients of the beverage mix to fine pulverulent form (as by grinding) and thoroughly admixing these ingredients to provide a uniform homogeneous mixture thereof. The admixing may be done before or after reduction to the desired size. However, if the flavoring is in the form of tiny capsules, these capsules are not subjected to any grinding or other reducing step to avoid breaking thereof, and are mixed with the other ingredients when they are of the proper size. The majority of the particles are preferably fine enough to be capable of passing through a U.S. #150 sieve. The particle size is controlled in part by the way in which they are moisturized during agglomeration and the kind of citric acid used, as described in more detail hereinafter. Once the ingredients have been uniformly mixed, they are wetted with enough liquid (preferably water) to wet the citric acid particles (which are highly soluble in liquids such as water) to a degree sufficient to cause the surfaces thereof to become tacky and adhesive. The liquid is preferably a solvent which dissolves a portion of the particles on which it is deposited and forms an adhesive solution on the surface thereof which serves to bond the particles together in the form of porous agglomerates. Although water is the preferred solvent, other suitable solvents can be used if desired.

The wetted particles are then brought into random contact with one another whereby they stick together in clusters and form the desired porous agglomerated product, with the citric acid serving as the primary bonding agent in the low calorie mixes.

The most successful agglomeration of this low calorie beverage mix is accomplished by limiting the amount of moisture increase or the amount added to a maximum limit of about 3.5%. If the material is over-moisturized, too much thereof goes into solution, making it difficult if not impossible to form porous agglomerates therefrom. Excess solution also tends to foul the agglomerating equipment and to fill the spaces between whatever particles remain, thereby reducing or destroying the porosity of the product. The increase in moisture content falls within a preferred range of .5–3.5%, with the optimum increase being in the range of 1.5–2.5%. Thus, it is desirable to retain as much as possible the physical particulate entity of the citric acid during the wetting and agglomeration thereof.

The moisturization is preferably achieved while the particles are in a densely dispersed agitated condition such as is provided on the apparatus hereinafter to be described, with the moisture and particles being thoroughly intermixed so that the particles of the mixture are uniformly moistened.

The moisturization is preferably accomplished by condensation, as this method provides the best manner of controlling the degree and uniformity of moisturization. We have also found that best results are obtained by carefully controlling the condensation conditions, which can be expressed by the relation between the temperature of the dry material fed to the humid atmosphere of the agglomerator and the wet and dry bulb temperatures of said humid atmosphere from whence the agglomerating liquid comes. We have found it desirable to limit the feed temperature of the material to a maximum of about 120° F., with the temperature preferably not substantially higher than 100° F. The humid atmosphere preferably has a dry bulb temperature not substantially lower than 255 degrees F., with a range of 255–275° F. considered desirable. The wet bulb temperature of the humid air should not substantially exceed 170 degrees F., with a wet bulb temperature of 160–170 degrees F. being a desirable range when the feed temperature of the mixture is about 100° F. Lower wet bulb temperatures can be used with lower feed temperatures. Any combination of feed temperature and wet and dry bulb temperatures which will produce substantially the same results and degree of moisturization as that produced by a feed temperature of 100° F., a dry bulb temperature of 255–275° F., and a wet bulb temperature of 160–170° F. is considered to be within the scope of this invention.

When the wet agglomerates have been formed, they are preferably almost immediately subjected to a drying operation to remove all or a major portion of the added moisture therefrom to improve the agglomerated product and make it better capable of withstanding the rigors of subsequent handling. The starting material usually contains not more than 4% total moisture, and preferably only 2–3%, and the agglomerated product is preferably dried back to within ½% plus or minus of the original moisture content.

Thus, one preferred embodiment of this invention comprises dispersing the pulverulent particles to be agglomerated at a temperature of about 100° F. in a humid atmosphere having a wet bulb temperature of 160–170° F. and a dry bulb temperature of 255–275° F., condensing moisture on the particles and increasing the moisture content thereof by not more than 3.5% and preferably within the range of 1.5–2.5%, the condensed moisture forming adhesive surfaces on the citric acid particles, bringing the wetted particles into random contact whereby they form porous agglomerates, and then drying the wet agglomerates to remove substantially all of the added moisture therefrom.

Reference is now made to the accompanying drawing for a more detailed description of one preferred means of carrying out our invention. The illustrated apparatus and method of agglomerating a product thereon is disclosed and discussed in more detail in U.S. Patent No. 2,995,773. The agglomerating apparatus illustrated includes a feed hopper 10 which serves as a source of dry beverage mix starting material to be agglomerated, which material is of the requisite degree of fineness. The material to be agglomerated is drawn from the hopper 10 into the screw type conveyor 11 which continuously feeds the fine particulate material into the elongate agglomerator structure 12. The agglomerator has a perforated or foraminous screen 13 extending longitudinally thereof upon which the starting material is initially deposited and across which it travels from the inlet towards the discharge end and in the course of the travel thereover is converted into the desired agglomerated end product.

The agglomerator, in the form shown, is divided into a longitudinal series of adjacent operational compartments successively labeled A, D and CS and in which the agglomerating, drying, and cooling and sizing respectively take place. The agglomerator illustrated is also provided with means for transporting the bed of material through the agglomerator. This includes means for vibrating the entire agglomerator structure 12 to provide the generally forward motion of the bed of material passing therethrough, which vibrating means includes the supporting rocker arms 14 and the eccentric drive pitman 15 and suitable drive means therefor. As the material travels over the perforate screen 13, it is maintained in a dispersed, agitated substantially fluidized condition by a stream of humid air or water vapor such as steam which is constantly injected into the lower portion of the first compartment or agglomerating section A through the port 16 and passes upwardly through the screen 13 and the bed of material at a velocity sufficient to maintain the particulate bed in a substantially fluidized state with a high particle-vapor ratio, and the particles in close, relatively dense, agitated proximity, and after passing through the bed of material is removed through a suitable discharge or exhaust port 17 provided on top of the agglomerator.

To avoid excessive fouling of the screen 13 by the wetted adhesive particles, the screen may be of the endless continually moving type which continuously leaves and returns to the agglomerating section A, with means provided for cleaning that portion of the screen removed from the agglomerating compartment between its removal therefrom and its re-entry thereto, or the fluidizing vapor gas may be superheated so that the particles adjacent the screen absorb the superheat without condensation and without becoming sticky, while the particles in the upper strata of the bed of material in compartment A and out of contact with the screen have the moisture condensed thereon as set forth in the aforementioned patent.

After the agglomeration of the material in the agglomerating compartment A due to the formation of adhesive surfaces on the particles by the condensation of the water vapor on the particles and the bringing together of the adhesive particles by the general agitation and mild turbulence of the bed provided by its fluidized nature and the vibration of the agglomerator, the agglomerated material passes to the next stage or compartment D in which the added moisture is removed and the material is dried by means of a current of warm air passing constantly through the screen 13 in the bed of agglomerates, the stream of hot air entering the bottom of compartment D through duct 18 and exhausting therefrom through the exhaust opening 19 in the roof. Drying air having a temperature of about 250° F. is desirable. However, considerable latitude is permissible in the drying temperature. The drying of the agglomerates strengthens and rigidifies them and removes the stickiness therefrom to enable them to be handled, packaged, stored and transported. After drying, the warm dried agglomerates pass to the next or final stage or compartment CS in which the agglomerates are optionally subjected to a stream of cooling air entering from duct 20 and exhausting through escape openings 21 in the roof to cool the agglomerates to room temperature and place them in a rigid state.

In the last compartment CS the agglomerates are also classified while being cool. The hot dried agglomerates pass from the screen 13 onto a coarser classifying screen 22, the products falling through the screen 22 onto the finer collection screen 23 therebelow, the oversized material remaining on the screen 22, the product and oversized material being discharged as indicated.

Thus, the material to be agglomerated is introduced into a warmer atmosphere of humid air or steam which is partially or nearly saturated with water vapor and therefore condensation occurs on the surface of the cooler particles. Solution occurs on the surface of the citric acid particles forming a sticky tacky adhesive surface thereon. Due to the agitation and proximity of the particles in the agglomerating chamber, the particles comprising the mixture stick to one another when making contact with each other to progressively build up soft agglomerates which are characterized by the proportionately large number of voids and interstices extending therethrough providing a liquid with ready access to substantially all of the particles forming the agglomerates to quickly disperse and dissolve them in a liquid. The agglomerates are then subjected to conditions which cause drying and the removal of the added moisture resulting in hardening or firming of the agglomerates.

The low calorie beverage agglomerates of this invention are very porous and characterized by the multitude of fine particles in each agglomerate which are randomly bonded together at their interfaces by the citric acid which functions as the bonding agent, the particles defining a large number of voids or interstices which form a network of passages through the agglomerate to enable a liquid to quickly penetrate the agglomerate interior and rapidly reach all of the particles comprising the agglomerates and break the bond holding individual particles together and disperse them in the liquid for quick (virtually instant) dispersion and dissolution without any lumping into difficult to penetrate balls or masses in the liquid. The agglomerates of this invention are further characterized by being free flowing and non-caking, even under severe atmospheric conditions involving significant changes in humidity. Thus, by grouping large numbers of these very fine pulverized particles together into larger porous agglomerates, we obtain the advantage of fine individual particle size for maximum rate of solution and the advantage of the larger size agglomerates which provide the free flowing non-caking characteristics.

The agglomerated product of this invention has a bulk density which is lower than that of the starting material, is substantially dustless and the agglomerates are friable yet strong enough to resist breaking down and pulverizing or powdering when subjected to the rigors of handling, shipping and storing.

The lower bulk density of the agglomerated product is of particular advantage in this type of product. The dry mix is usually packaged in amounts sufficient to make one or two quarts of the desired beverage. Since only a very small amount of mix is needed to make one or two quarts of beverage (5–7 grams for 2 quarts), only a minute sized package is actually needed to house the volume of mix. However, for convenience of handling, display, etc., a package considerably larger than the minimum required is actually used, resulting in a considerable amount of excess space in each package. The lower bulk density product enables this small amount of mix to occupy more space and thereby better fill these packets. Also, the agglomerated form better assures complete emptying of the contents from the package. Portions of conventional unagglomerated powdered mix tend to remain in the corners of the package and get thrown away, rather than used, or at least make the complete emptying of the package more difficult.

The unagglomerated dry mixture from which the agglomerated product is formed is a pale color which is only vaguely reminiscent of the natural fruit which corresponds to the flavoring. This is because in the unagglomerated form, the coloring in the physical admixture of ingredients is of such a small amount that it is diluted and disguised by the much larger quantities of the other ingredients.

In contrast, the agglomerated product has a deep intense color which is much darker and deeper than the unagglomerated material. The color of the agglomerated material is very similar in color to and much more suggestive of the natural fruit of the flavoring of the mix and to the actual color that the drink will be when reconstituted in water than the unagglomerated material. This more uniform and intense coloring of the material takes place when the particles are wetted during the agglomeration operation. The wetting of the coloring and the intimate relationship of the agitated wetted particles causes the coloring to be spread uniformly over virtually all the particles comprising the mix so that the coloring is more uniformly distributed throughout the entire mixture. The agglomerated product is easy to measure at high speed and with a high degree of accuracy, which is particularly important during the packaging thereof. It disperses and dissolves almost instantly when added to a liquid.

The following are a few illustrative examples of typical drink mix formulations according to this invention.

EXAMPLE I

Raspberry:

| | Percent |
|---|---|
| Anhydrous citric acid | 55.1067 |
| Calcium cyclamate | 32.2120 |
| Calcium saccharine | 2.6843 |
| Raspberry flavor | 1.5862 |
| Sodium citrate | 7.9310 |
| Coloring (FD&C—Certified Food Coloring): | |
| Red #2 | 0.4579 |
| Blue #1 | 0.0039 |

EXAMPLE II

Orange:

| | |
|---|---|
| Anhydrous citric acid | 65.229 |
| Calcium cyclamate | 27.731 |
| Calcium saccharine | 2.310 |
| Orange flavor | 2.816 |
| Coloring (FD&C—Certified Food Coloring): | |
| Yellow #6 | 1.877 |
| Red #2 | 0.037 |

EXAMPLE III

Grape:

| | |
|---|---|
| Anhydrous citric acid | 54.891 |
| Calcium cyclamate | 32.086 |
| Calcium saccharine | 2.674 |
| Grape flavor | 1.580 |
| Sodium citrate | 7.900 |
| Coloring (FD&C—Certified Food Coloring): | |
| Red #2 | 0.790 |
| Blue #1 | 0.079 |

Agglomerated mixes having formulations similar to Example I–III have had a bulk density of about 18–22 lbs. per cubic foot. In contrast, the powdered starting material from which the aforementioned agglomerated product was formed has a bulk density of about 37 lbs. per cubic foot. The same material in conventional unagglomerated form which includes a bulking agent (mannitol) has a bulk density of about 34 lbs. per cubic foot. Thus, it will be appreciated that the agglomerated product has a bulk volume almost twice that of the conventional unagglomerated mix, with the aforementioned advantages associated therewith.

Insofar as rate of solution is concerned, the agglomerated low calorie mixes dissolve in a matter of a few seconds (virtually instantly) upon addition to water, even cold water, without requiring any mixing to obtain the desired dispersion and dissolution. In contrast, the conventional unagglomerated mixes require vigorous stirring to break up the lumps and masses which naturally form and get the material into solution. Even with vigorous stirring, it usually takes a minute or more to dissolve all the conventional material.

A typical specific example of a low calorie instant drink mix agglomerated according to the method of our invention by the apparatus illustrated and previously described is as follows:

EXAMPLE IV

An agglomerated raspberry flavored low calorie instant drink mix having the same formulation as set forth in Example I was agglomerated as follows:

All of the ingredients of the mix with the exception of the flavoring were first physically mixed and then ground to fine pulverulent form in a micro-pulverizer equipped with a screen having round openings .039 inch in diameter. The ground material from the micro-pulverizer was then sent to a ribbon mixer where the flavoring was blended in. The blended ingredients were then agglomerated on a vibratory agglomerator similar to that illustrated. This agglomerator was 6 inches wide and had an agglomerating section 18 inches long, a drying section 60 inches long and a cooling section 48 inches long. Humid air was passed through the agglomerating section at a rate of 200 feet vertical superficial velocity, this air having a wet bulb temperature of 165 degrees F. and a dry bulb temperature of 275 degrees F. The agglomerating section was vibrated with an amplitude of ½ inch at 700 cycles per minute directed at a 45 degree angle with the horizontal in the direction of travel. The material was fed into the agglomerator at a free feed rate of 300 pounds per hour. The wet agglomerates were dried in the drying section with drying air having a dry bulb temperature of 250 degrees F., which air was passed through the drying section at a rate of 100 vertical superficial velocity. A screen analysis of the starting material was as follows:

| On U.S. sieve No.: | Percent |
|---|---|
| 100 | 1.1 |
| 140 | 3.1 |
| 200 | 21.7 |
| 230 | 22.3 |
| 270 | 22.0 |
| 325 | 21.6 |
| Through U.S. sieve No. 325 | 8.2 |

The majority of the agglomerated product was finer than 4 mesh and coarser than 100 mesh.

We have also found that the best results are achieved when anhydrous citric acid is used. Citric acid hydrate goes into solution so readily when moisturized in an agglomeration system such as hereinbefore described that it is very difficult to control the moisturization and prevent complete dissolution of the citric acid, thereby making it difficult to successfully agglomerate the product.

As previously mentioned, the particle size is controlled in part by the way in which the moisture is added and the kind of citric acid used. A carefully controlled condensation method of applying the moisture as hereinbefore described permits a finer particle size to be used than if the liquid were applied directly to the particles as in the form of droplets. The hydrated form of citric acid generally requires a larger particle size than the anhydrous form, in order to minimize as much as possible the rapid rate of solution of the hydrated form.

The following example illustrates the difference in coloring of the agglomerated product of this invention as compared with the unagglomerated material from which it is formed.

EXAMPLE V

A grape flavored mix having the formulation of Example III was subjected to the well known Hunter test both before and after agglomeration thereof to show the marked difference in uniformity and intensity of color between the agglomerated product and unagglomerated starting material, the mix having been agglomerated in the manner and on the apparatus hereinbefore described. The results were as follows:

| | Unagglomerated | Agglomerated |
|---|---|---|
| Rd value | 50.3 | 14.1 |
| a value | +8.6 | +19.6 |
| b value | −1.5 | −3.2 |

Although this disclosure has been directed to beverage mixes of the type hereinbefore described, the scope of the invention is not necessarily limited thereto. We have found that the method of agglomeration hereinbefore taught is applicable to all mixtures containing citric acid in amounts sufficient to function as the bonding agent, as well as to the agglomeration of citric acid itself and to conventional beverage mixes containing citric acid and a natural sugar such as sucrose and/or dextrose.

It should also be understood that the beverage mixes of this invention, as well as other citric acid containing materials coming within the scope hereof, may have other ingredients which may serve in some small way as bonding agents. Thus, in those mixes which include the buffering agent sodium citrate, the sodium citrates also serve as a bonding agent.

It will, of course, be understood that various changes may be made in the form, details, arrangement and proportions of the various parts without departing from the scope of our invention.

What we claim is:
1. A method for preparing porous, water-soluble agglomerated beverage drink mixes comprising the steps of:
   (a) moistening a uniform admixture of particles by subjecting said admixture of particles to a humid atmosphere and condensing moisture on said particles and thereby increasing the moisture content of said admixture of particles within the range of 0.5 percent to less than 3.5 percent by weight, said admixture comprising beverage mix particles of citric acid and synthetic sweetener as major components of said admixture and coloring agent particles as a minor component of said admixture, said admixture particles being further characterized as having a particle size such that a majority of said particles pass through a 150-mesh sieve (U.S. Sieve Series) with the critic acid particles having a particle size such that a majority of said citric acid particles pass through a 230-mesh sieve (U.S. Sieve Series);
   (b) bringing the moistened mix particles into random contact with one another thereby causing said particles to stick together as aggregates of a size substantially greater than the particles of said admixture; and,
   (c) removing moisture from the aggregates to provide free-flowing, porous agglomerates thereof.

2. The method according to claim 1 wherein the moisture level of the uniform admixture of particles prior to the moistening thereof has a moisture content of less than 4 percent by weight.

3. The method according to claim 2 wherein the admixture of particles includes citric acid in an amount sufficient to enable the citric acid to function as the primary bonding agent.

4. The method according to claim 3 wherein the citric acid particles contained in said admixture prior to the moistening thereof are anhydrous citric acid.

5. The method of claim 1, wherein the wetting of said particles is accomplished by condensing moisture thereon under conditions substantially equivalent to dispersing the particles at 100° F. in a humid atmosphere having a dry bulb temperature of 255–275° F. and a wet bulb temperature of 160–170° F.

6. The method of claim 2, wherein the synthetic sweetener is selected from the group consisting of cyclamate and saccharine.

7. The method of claim 6, wherein the citric acid comprises 54–67% by weight of the mixture and the synthetic sweetener comprises 27–33% of the mixture.

8. The method of claim 3, wherein the mixture includes water soluble coloring and flavoring and the moisture content of said admixture is increased within the range of 1.5 percent to 2.5 percent.

9. A method of improving the uniformity of color of a dry mixture of pulverulent particles in accordance with claim 2 wherein the mixture includes soluble particles of coloring as an essential ingredient thereof, said method comprising wetting the particles comprising said mixture and thereby forming adhesive surfaces on at least some of the particles and dissolving the coloring, and agitating the wetted particles while maintaining them in intimate relationship whereby the dissolved coloring is spread over the majority of the particles comprising said mixture and the particles make random contact with each other and form porous agglomerates and then removing a sufficient amount of moisture from the agglomerates to provide a free-flowing agglomerate thereof.

10. An agglomerated, free-flowing, water-soluble, low caloric beverage drink mix aggregate composition comprised of beverage drink mix particles, said beverage mix particles containing citric acid particles and synthetic sweetener particles as principal components of said aggregate composition and coloring agent particles as a minor component of said aggregate composition with a majority of said drink mix particles having a particle size less than 105 microns, said aggregate composition being further characterized as having a porous mix structure of beverage particles randomly bonded together at their interfaces by the citric acid particles with a majority of the citric acid particles therein having a particle size less than 62 microns.

11. The product of claim 10, wherein the synthetic sweetener is selected from the group consisting of cyclamates and saccharines.

12. The product of claim 11, wherein said product includes fruit flavoring and coloring.

13. A porous agglomerated product according to claim 12 wherein the product is comprised of 64–68% citric acid, 26–29% cyclamate, approximately 2–3% saccharine, the ratio of cyclamate to saccharine being approximately 12 to 1, with the remainder of said product consisting principally of fruit flavoring and coloring.

14. A porous agglomerated product according to claim 13 wherein the product is comprised of 53–56% citric acid, approximately 8% sodium citrate, 31–33% cyclamate, approximately 2–3% saccharine, the ratio of cyclamate to saccharine being approximately 12 to 1, with the remainder of said product consisting principally of fruit flavoring and coloring.

References Cited

UNITED STATES PATENTS

| | | | |
|---|---|---|---|
| 2,178,569 | 11/1939 | Ferguson | 99—130 |
| 2,803,551 | 8/1957 | Helgren | 99—78 X |
| 2,982,653 | 5/1961 | Block et al. | 99—78 |
| 2,995,773 | 8/1961 | Gidlow et al. | 18—1 |
| 2,999,293 | 9/1961 | Taff et al. | 23—313 |
| 3,011,897 | 12/1961 | Grosvenor et al. | 99—141 |
| 3,143,428 | 8/1964 | Reimers et al. | 99—141 |

MAURICE W. GREENSTEIN, *Primary Examiner.*

U.S. Cl. X.R.

99—148, 199, 28, 141